Figure 1:
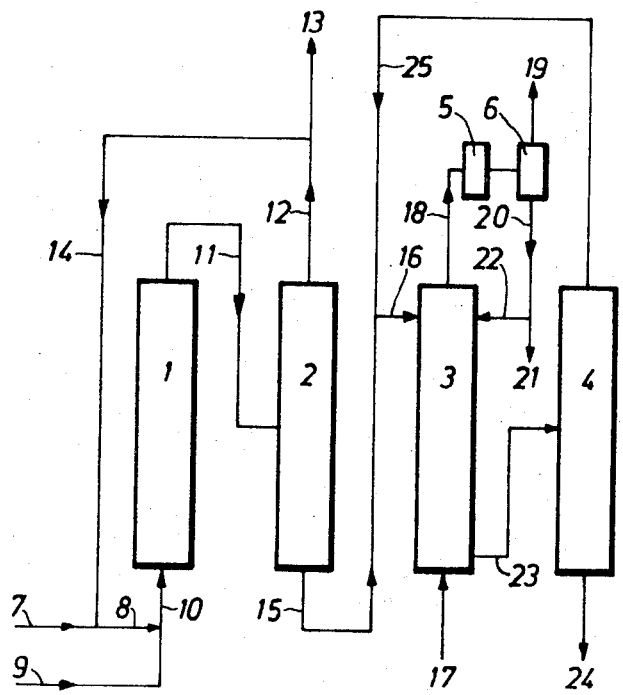

United States Patent [19]
Scharfe et al.

[11] 3,870,730
[45] Mar. 11, 1975

[54] PRODUCTION OF ANTHRAQUINONE FROM NAPHTHALENE

[75] Inventors: Gerhard Scharfe; Johann Grolig, both of Leverkusen, Germany

[73] Assignee: Bayer Aktiengesellschaft, Leverkusen, Germany

[22] Filed: Apr. 12, 1973

[21] Appl. No.: 350,570

[30] Foreign Application Priority Data
Apr. 15, 1972 Germany.............................. 2218316
Sept. 16, 1972 Germany............................. 2245555

[52] U.S. Cl.............................. 260/369, 260/346.4
[51] Int. Cl................................................ C09b 1/00
[58] Field of Search..................................... 260/369

[56] References Cited
UNITED STATES PATENTS
2,652,408    9/1953    Lecher et al........................ 260/369

Primary Examiner—Lorraine A. Weinberger
Assistant Examiner—E. Jane Skelly
Attorney, Agent, or Firm—Burgess, Dinklage & Sprung

[57] ABSTRACT

In the production of anthraquinone wherein naphthalene is oxidized to form naphthoquinone and phthalic anhydride, the naphthoquinone is reacted with butadiene to form tetrahydroanthraquinone, and the tetrahydroanthraquinone is reacted with oxygen to form anthraquinone, the improvement which comprises effecting the reaction of naphthoquinone with butadiene at an elevated temperature in the presence of naphthalene to produce a reaction mixture comprising naphthalene, tetrahydroanthraquinone and phthalic anhydride, separating the naphthalene from said reaction mixture, reacting the remaining mixture comprising tetrahydroanthraquinone and phthalic anhydride at an elevated temperature with molecular oxygen, and removing phthalic anhydride from the oxidation reaction mixture comprising anthraquinone and phthalic anhydride. Because the solvents in the several steps are naphthalene and phthalic anhydride and these are part of the system anyhow, obviously there is no contamination with extraneous materials. The equipment is simple and inexpensive and produces the desired material in high yield and purity.

12 Claims, 3 Drawing Figures

PRODUCTION OF ANTHRAQUINONE FROM NAPHTHALENE

The present invention relates to a process for the production of anthraquinone from naphthalene.

From U.S. Pat. No. 2,938,913 a process is known for the production of anthraquinone wherein naphthalene is oxidized with air in the gas phase, the reaction product containing naphthoquinone, phthalic anhydride and nonreacted naphthalene is taken up in a solvent which is immiscible with water and has a boiling point above 230°C and wherein the resulting solution is treated with water; in this reaction the phthalic anhydride is converted into phthalic acid and an aqueous solution of phthalic acid and a solution of naphthalene and naphthoquinone is obtained in the solvent boiling above 230°C. The solution containing naphthoquinone is reacted with butadiene at an elevated temperature; the reaction occurring between naphthoquinone and butadiene results in the formation of tetrahydroanthraquinone. The reaction solution is extracted with an aqueous sodium hydroxide solution, an aqueous solution of a salt of tetrahydroanthraquinone being obtained. By introducing air into the hot aqueous NaOH solution, the salt of tetrahydroanthraquinone is converted into anthraquinone which crystallizes out of the solution as a fine powder and is recovered by filtration as crude anthraquinone.

The resulting anthraquinone is then dried and subjected to sublimation for purification. The naphthalene is separated from the solution remaining after extraction with an aqueous sodium hydroxide solution and recycled to the reaction to form naphthoquinone.

This method of working, however, has the following disadvantages: prior to the reaction of naphthoquinone with butadiene, the phthalic anhydride must be removed from the oxidation mixture with hot water as a dilute aqueous phthalic acid solution. In order to be able to extract the phthalic anhydride, an inert, high-boiling solvent, e.g. chloronaphthalene is added. The tetrahydroanthraquinone resulting from the subsequent reaction of naphthoquinone with butadiene has to be recovered from the reaction solution with dilute aqueous alkali. The following oxidehydrogenation of the alkali salt of the tetrahydroanthraquinone with air is carried out in a very dilute aqueous solution so that a large reaction volume is required. The reaction with air is carried out in the heterogeneous phase due to the insolubility of anthraquinone in an aqueous medium. This renders the continuous performance of the process difficult, since the precipitating fine anthraquinone powder causes clogging and considerable foaming of the oxidation solution. Subsequent separation of the anthraquinone from this heterogeneous mixture involves technical difficulties and alkali losses. The anthraquinone finally obtained from the aqueous alkali solution has first to be subjected to a washing and drying process and further purified, in general by means of sublimation. The phthalic acid forming as a by-product during extraction with hot water then has to be reconverted by means of dehydration at temperatures of above 200°C to phthalic anhydride, this method being uneconomical and technically complicated. All these steps require a great number of reaction vessels thus rendering the process highly uneconomical.

It is accordingly an object of the present invention to provide a simple, inexpensive process for producing anthraquinone from naphthalene.

These and other objects and advantages are realized in accordance with the present invention which relates to an improvement in the production of anthraquinone by oxidizing naphthalene to form naphthoquinone and phthalic anhydride, reacting the naphthoquinone with butadiene to form tetrahydroanthraquinone and reacting that with oxygen to form anthraquinone. Specifically, the improvement comprises effecting the reaction of naphthoquinone with butadiene at an elevated temperature in the presence of naphthalene to produce a reaction mixture comprising naphthalene, tetrahydroanthraquinone and phthalic anhydride, separating the naphthalene from said reaction mixture, reacting the remaining mixture comprising tetrahydroanthraquinone and phthalic anhydride at an elevated temperature with molecular oxygen, and removing phthalic anhydride from the oxidation reaction mixture comprising anthraquinone and phthalic anhydride.

The process can be carried out by performing the reaction with butadiene in the liquid phase at temperatures of about 80 to 250°C in the presence of about 20 to 90 % by weight of naphthalene, by treating the remaining mixture with oxygen in the presence of about 50 to 90 % by weight of phthalic anhydride in the liquid phase at temperatures of about 150 to 300°C after separating the naphthalene from the reaction mixture and finally by removing the phthalic anhydride by distillation from the reaction mixture consisting substantially of anthraquinone and phthalic anhydride in order to recover the anthraquinone.

The distillation for the separation of the phthalic anhydride can be carried out at atmospheric, superatmospheric or subatmospheric pressure. The distillation can be performed in the presence of gaseous compounds, for example in the presence of gases which consist substantially of nitrogen and/or carbon dioxide and may contain as additional constituents oxygen, water vapor and naphthalene. These gases can be introduced at the sump of the distillation column, for example into the circulation evaporator. The distillation in the presence of gases can be carried out under pressure, for example at 5 atms. Liquid crude anthraquinone can be removed at the sump of the column or a gas stream can be removed from the lower part of the column as a stream which contains anthraquinone in vapor form and from which liquid or solid anthraquinone can be separated by cooling. Phthalic anhydride in liquid or solid form can be separated by cooling from the gases which accumulate at the head of this column. When working in the presence of gases, gas mixtures can be employed which contain oxygen. The oxygen content can vary within wide limits. It is advantageous to use such oxygen concentrations which are outside the explosion limits for the organic compounds when carrying out the process. The distillation can be carried out in the presence of gases which contain about 1 to 10 mole % of oxygen, for example about 2 to 6 mole % of oxygen.

the introduction of oxygen-containing gases into the sump of the column for the separation by distillation of phthalic anhydride has the advantage that amounts of non-reacted tetrahydroanthraquinone, which may be present, are converted into anthraquinone and hence the purity of the resulting anthraquinone is increased. A further advantage is an increase in the anthraquinone yield. Apparently small amounts of high-boiling compounds, which accumulate in the sump of the column, are decomposed to carbon dioxide, phthalic anhydride and anthraquinone due to the presence of molecular oxygen at temperatures of, for example, 300 to 350°C which prevail in the sump of the column.

The separation of anthraquinone from the mixture consisting substantially of phthalic anhydride and anthraquinone can also be performed according to methods other than distillation. The mixture of phthalic anhydride and anthraquinone can be cooled to temperatures above about 130°C at which phthalic anhydride is liquid but at which not all of the anthraquinone present is soluble in the phthalic anhydride, so that solid anthraquinone precipitates. The solid anthraquinone can be separated off according to known processes, for example by centrifuging, filtering or decanting and purified, if desired, by other processes such as sublimation, distillation, and/or extraction.

The composition of the starting product for the reaction with butadiene can vary within wide limits. The ratio of naphthoquinone/phthalic anhydride can lie between about 5 : 1 and 1 : 5, for example between about 2 : 1 and 1 : 2. The naphthalene content can amount from about 20 to 90% by weight, for example 30 to 70% by weight. Naphthalene, for example as the recycle product from the naphthalene separation, can be added in addition to the reaction product consisting of naphthalene, naphthoquinone and phthalic anhydride and resulting from the oxidation of naphthalene in order to arrive at the desired content of naphthalene in the starting product for the reaction with butadiene.

The reaction with butadiene can be carried out in the gaseous, liquid or in the mixed phase, in which dissolved and gaseous butadiene is present. Butadiene can be employed in the pure form or in admixture with other compounds, for example in admixture with butanes and/or butenes. Calculated on the base of the naphthoquinone used, about 1 to 5 moles of butadiene per mole of naphthoquinone are generally employed, for example about 1 to 2 moles or about 1.0 to 1.2 moles of butadiene per mole of naphthoquinone. The reaction can be carried out discontinuously, e.g. in stirrer vessels, by introducing the butadiene at an elevated temperature, for example at temperatures of about 80 to 120°C, into the liquid mixture of naphthalene, naphthoquinone and phthalic anhydride. In the stirrer vessel a liquid phase of naphthalene, phthalic anhydride and naphthoquinone can be present in which the butadiene is completely or partially dissolved. A gas phase consisting substantially of butadiene can be above the liquid phase. The pressure of the reaction mixture can vary within certain limits, for example between about 1 and 30 atms. depending on the temperature, the concentration ratios and the butadiene excess. The reaction with butadiene can be carried out isothermally by providing adequate means, for example cooling water, for leading off the reaction heat. However, the reaction can also be carried out adiabatically or partly adiabatically, as a result of which the reaction product heats up to a higher temperature than at the start of the reaction due to the non-removed or only partly removed reaction heat. For example, the initial temperature can be 80 to 100°C and the maximum temperature attained because of an adiabatic or partly adiabatic method of working can be up to about 250°C. After completion of the reaction the reaction product can be brought to the end temperature desired for further working up, for example 150 to 200°C, by cooling or heating. The non-reacted butadiene can be separated off by releasing pressure and used anew for further reactions.

The reaction of naphthoquinone with butadiene can be carried out continuously, for example in a stirrer vessel cascade or a reaction tube. The process can also be carried out isothermally, adiabatically or partly adiabatically. Using the adiabatic or partly adiabatic method of working, it is possible to achieve an increase in temperature, e.g. from about 80 to 100°C to about 130 to 250°C or to 150 to 200°C from the start to the end of the reaction by adjusting the content of phthalic anhydride and naphthalene which have no part in the reaction. The residence times for the reaction with butadiene can vary within wide limits depending on the reaction temperature. They can lie between about 1 and 200 minutes, for example between 30 and 90 minutes. In the reaction with butadiene an almost complete reaction of naphthoquinone to tetrahydroanthraquinone can be achieved.

The reaction with butadiene can be carried out in such a way that butadiene in gaseous form or a butadiene-containing recycled gas is conducted through the liquid mixture consisting of naphthalene, naphthoquinone and phthalic anhydride. This reaction can be carried out under pressure, for example 3 to 5 atms, and after separating the gas phase by cooling under pressure, a butadiene-containing liquid mixture recovered which can be recycled into the reaction with the naphthoquinone.

If desired, the butadiene used up in the reaction can be replaced by introducing fresh butadiene into the recycle gas.

After separating the non-reacted butadiene, the naphthalene is separated in a known manner from the reaction mixture consisting substantially of naphthalene, tetrahydroanthraquinone and phthalic anhydride. Separation of the naphthalene is preferably carried out by fractional distillation, naphthalene forming as the head product and phthalic anhydride and tetrahydroanthraquinone as the sump product. The distillation can be carried out at reduced pressure, for example 50 to 200 mm Hg. It is advantageous to select the pressure so that the head product, naphthalene, and the sump product, which consists substantially of phthalic anhydride and tetrahydroanthraquinone, are obtained in liquid form. The head product, naphthalene, can be recycled into the reaction of naphthalene with molecular oxygen to form naphthoquinone and phthalic anhydride. A branch stream of the head product of the distillation can be recycled as a diluent into the reaction of naphthoquinone with butadiene.

The reaction of the mixture of phthalic anhydride and tetrahydroanthraquinone with molecular oxygen is carried out in the presence of liquid phthalic anhydride at temperatures of about 150 to 300°C, preferably 180 to 250°C. The oxygen can be employed in pure form or in admixture with inert compounds, e.g. with nitrogen, for example in the form of air. The process can also be carried out with mixtures of nitrogen and oxygen which have an oxygen content of about 1 to 20 % by volume. The reaction of tetrahydroanthraquinone with oxygen can be illustrated by the equation tetrahydroanthraquinone + $O_2$ → anthraquinone + $2H_2O$ The reaction of the tetrahydroanthraquinone/phthalic anhydride mixtures with molecular oxygen can be carried out in the presence of about 50 to 90%, for example 70 to 80%, by weight of phthalic anhydride as a diluent.

The treatment of tetrahydroanthraquinone with oxygen can be carried out for example as follows: after separation of the naphthalene a reaction mixture is obtained consisting of tetrahydroanthraquinone and phthalic anhydride which is optionally diluted with additional phthalic anhydride so that a 10 to 50% solution of the tetrahydroanthraquinone in phthalic anhydride is obtained. This solution is oxidized with gases containing air or molecular oxygen at an elevated temperature. The anthraquinone remains homogeniously dissolved in phthalic anhydride so that there is no danger of clogging occurring. The air- or oxygen-containing gas can be introduced in many different ways into the liquid reaction mixture, e.g. through nozzles, frits or gasification stirrers. After cooling of the exhaust gas the phthalic anhydride taken along according to the respective vapor pressure can be obtained in liquid or solid form free of reaction water by partly cooling. The phthalic anhydride can be separated from the liquid reaction mixture, which consists substantially of anthraquinone and phthalic anhydride, by means of distillation. The anthraquinone can then be recovered by further distillation in vacuo in pure form.

In a technical embodiment of the process according to the invention, the mixture obtained after separation of the naphthalene and consisting of phthalic anhydride and tetrahydroanthraquinone is introduced into a bubble column, optionally after adding phthalic anhydride as a diluent. At the bottom of this bubble column the molecular oxygen, for example in the form of air, is introduced.

At the head of the bubble column a gas stream is removed, which consists substantially of nitrogen, non-reacted oxygen and steam, formed during the reaction, and contains gaseous phthalic anhydride according to the vapor pressure of the phthalic anhydride at the reaction temperature. This gas stream can be cooled, for example to 130 to 150°C in order to separate off in liquid form most of the phthalic anhydride contained in the gas stream. The remaining gas stream can then be further cooled. It may be advantageous first to separate additional phthalic anhydride from the gas stream by cooling almost to the condensation point of water vapor, for example to 60 to 70°C. The phthalic anhydride, which is separated off, can be recycled at a suitable point into the process after melting. The residual gas consisting substantially of nitrogen, oxygen and water vapor can be given off as spent gas. A solution of anthraquinone in liquid phthalic anhydride, which is formed in the oxidation of tetrahydroanthraquinone, is drawn off at the sump of the bubble column and separated in a subsequent distillation column into phthalic anhydride as the head product and anthraquinone as the sump product. From the phthalic anhydride recovered during the condensation of the gas stream or from the head product of the column for the separation of phthalic anhydride/anthraquinone it is possible to remove phthalic anhydride in an amount which corresponds to the amount of phthalic anhydride formed during the reaction of naphthalene to phthalic anhydride/naphthoquinone. From the phthalic anhydride obtained during the condensation of the gas stream or from the head product of the column for the separation of phthalic anhydride/anthraquinone it is possible to introduce a branch stream into the bubble column as a diluent for the tetrahydroanthraquinone/anthraquinone conversion.

The relatively large amount of reaction heat produced during the reaction of tetrahydroanthraquinone to anthraquinone can be led off in a number of ways. Part of the reaction heat can be led off by the air stream being heated up in the bubble column. The reaction heat can also be led off by introducing the phthalic anhydride/tetrahydroanthraquinone mixture and the recycle phthalic anhydride at a lower temperature than the reaction temperature in the bubble column. Finally, reaction heat can be led off by evaporating phthalic anhydride in the gas stream. The amount of reaction heat led off depends on the amount of phthalic anhydride which is taken along with the gas stream and later recovered by condesnation. This amount can easily be changed within a wide range by adjusting the temperature in the bubble column within the range of about 150 – 300°C. Another means of influencing the withdrawal of reaction heat is to regulate the air stream which is introduced at the sump of the bubble column. The oxygen conversion rate on passing the air through the bubble column can vary within wide limits; it can for example amount to 10 – 90%. Using the above described methods in carrying out the process on an industrial scale, it is possible to remove the reaction heat freed during the reaction.

Naphthalene can also be separated off from the mixture consisting substantially of naphthalene, tetrahydroanthraquinone and phthalic anhydride in the presence of gases. The gases can be introduced at different points into a distillation column for separating naphthalene. The gases can be introduced into the sump of the distillation column, for example into the circulation evaporator. Carrying out distillation in the presence of gases can be performed at normal or elevated pressure, for example at 2 to 10, preferable 3 to 7 atms. The reaction mixture consisting substantially of naphthalene, tetrahydroanthraquinone and phthalic anhydride can be freed from dissolved excess butadiene by heating and/or reducing the pressure before it is fed into the distillation. The gases, which are introduced into the distillation column, can consist of nitrogen and/or carbon dioxide as the main components and they can contain as further components oxygen, water vapor and gaseous naphthalene. A mixture consisting substantially of phthalic anhydride and tetrahydroanthraquinone can be drawn off at the sump of the column. On introducing oxygen-containing gases into the distillation column, a partial or complete conversion of the tetrahydroanthraquinone to anthraquinone can take place in the sump of the column and in the column itself. In this instance a mixture consisting substantially of phthalic anhydride, tetrahydroanthraquinone and anthraquinone or of phthalic anhydride and anthraquinone can be removed at the sump of the column. The temperature at the sump of the column can be about 180 to 250°C, for example 210 to 230°C. At the head of the column a gas stream is removed which can consist of nitrogen, carbon dioxide, oxygen and water vapor and which contains gaseous naphthalene. This gas stream can be partly or completely cooled and partial condensation of the naphthalene achieved. the condensed naphthalene can be introduced as reflux into the distillation column. Part of this liquid naphthalene can also be added at different stages of the entire process. Naphthalene-containing gas, which accumulates at the head of the distillation column and from which part of the naphthalene has been optionally removed by condensation, can be recycled into the oxidation of the naphthalene to form naphthoquinone. When using oxygen-containing gases which are introduced into the naphthalene column, reaction heat is set free by the conversion of tetrahydroanthraquinone into anthraquinone and water. This reaction heat can be used to evaporate the liquid starting product. The oxygen content in the gas can be varied within wide limits when using oxygen-containing gases. It is advantageous to choose such oxygen concentrations which lie outside the explosion range for the organic compounds. Work can be carried out with an oxygen content of about 1 to 10%, for example 2 to 6 mole % of oxygen.

When working in the presence of oxygen-containing gases the sump of the naphthalene column consists substantially of phthalic anhydride, anthraquinone and optionally, tetrahydroanthraquinone. A further and complete conversion of the tetrahydroanthraquinone to form anthraquinone can be achieved in another step by treating with molecular oxygen at an elevated temperature, e.g. in a bubble column. Oxygen-containing gases can be conducted through the sump product, which consists substantially of phthalic anhydride, anthraquinone and tetrahydroanthraquinone, at normal or increased pressure and work can be carried out for example at 2 - 10, preferably 3 - 7 atms. The gas can contain as the main components nitgrogen and/or carbon dioxide and have an oxygen content of about 1 - 20 mole %, for example 2 - 10 mole % or 3 - 6 mole % of oxygen. The gas can contain in addition other compounds, such as water vapor, gaseous naphthalene and gaseous phthalic anhydride.

Work can be carried out by arranging the naphthalene column and bubble column in series connection or in superposition, by introducing oxygen-containing gases at the lower part of the bubble column, and by introducing the gases leaving the head of the bubble column directly into the sump of the naphthalene column. This embodiment permits the removal of a gas stream at the head of the naphthalene column which contains naphthalene and is largely free of phthalic anhydride and permits the withdrawal of a liquid mixture at the sump of the bubble column which consists substantially of anthraquinone and phthalic anhydride. It may be advantageous to introduce phthalic anhydride as an additional diluent into the bubble column and/or naphthalene column. A phthalic anhydride can be used which accumulates when separating phthalic anhydride/anthraquinone, for example as the head product of a column for separating phthalic anhydride/anthraquinone. This phthalic anhydride can contain products such as tetrahydroanthraquinone, anthraquinone, and naphthalene.

It is possible to withdraw phthalic anhydride at different stages of the entire process in such an amount as forms in the oxidation of naphthalene to naphthoquinone as a reaction product dissolved in naphthoquinone. This phthalic anhydride can, if necessary, be purified in a known manner by further purification processes, such as distillation. Work can also be carried out so that pure liquid phthalic anhydride is obtained as the end product, for example by partially condensing a gas stream containing phthalic anhydride.

The oxidation of naphthalene to form a mixture of naphthoquinone and phthalic anhydride can be carried out in the gas phase at temperatures of about 200 to 600°C, preferably 300 to 500°C, in the presence of oxygen-containing gases. Work can be carried out at normal or elevated pressure, for example at 2 - 10, preferably 3 - 7 atms. A liquid mixture consisting substantially of naphthalene, naphthoquinone and phthalic anhydride can be separated by cooling from the gas stream leaving the reactor and in addition a gas phase which can consist of nitrogen, carbon dioxide, water vapor, oxygen and gaseous napthalene, When working under pressure, for example at 6 atms, it is possible on cooling the gaseous reaction product to temperatures above the melting point of naphthalene (80°C), for example on cooling to 100°C, to condense the main amount of naphthalene and to ensure that the remaining gas contains only relatively small amounts of naphthalene. This gas can be recycled into the reaction, it being necessary to add the oxygen, which is required for the reaction of naphthalene to form naphthoquinone and phthalic anhydride, in the form of oxygen or oxygen/nitrogen mixtures, e.g. air. During recycling, the by-products, steam and carbon dioxide, which form during the reaction, are enriched so that measures have to be undertaken to remove these compounds at the rate at which they form. When air is used as the oxygen-containing starting material, nitrogen has to be additionally removed from the recycle gas corresponding to the quantity introduced. Work can be carried out in such a manner that a branch stream is removed from the recycle gas before it is introduced into the reaction. A recovery of the organic compounds contained in this branch stream in particular naphthalene, can be dispensed with and this exhaust gas converted into a clean exhaust gas by combustion. However, it is also possible to separate the naphthalene completely or partially according to known processes, e.g. by cooling the recycle gas and optionally to recycle it into the reaction. When using oxygen as the oxidation agent, a recycle gas can be obtained consisting substantially of carbon oxide, steam, oxygen and naphthalene, and the stream which is withdrawn to remove the reaction products $CO_2$ and water vapor from the recycle gas, can be cooled to recover the naphthalene contained therein.

When working in the presence of gases in the naphthalene column and optionally in the anthraquinone column, an oxygen-containing recycle gas can be conducted completely or partially through the distillation columns and then recycled again into the reaction of naphthalene to form naphtoquinone/phthalic anhydride. The oxygen contained in the recycle gas can be employed for the reaction of tetrahydroanthraquinone to anthraquinone in the naphthalene column and in the bubble column. Approximately the same pressure can be applied in the reaction of naphthalene to phthalic anhydride/naphthoquinone and in the distillations in the presence of gases and optionally in the operation of the bubble column; the gases leaving the distillation columns and optionally the bubble column can be recycled again into the reaction of naphthalene, the pressure loss occurring in the different parts of the apparatus being overcome, e.g. by a recycle gas blower. The by-products, in particular reaction water, produced during the reaction of tetrahydroanthraquinone to anthraquinone can be removed in a combined exhaust gas stream together with the reaction products, carbon dioxide and water, which form in the first stage.

Figure 2:
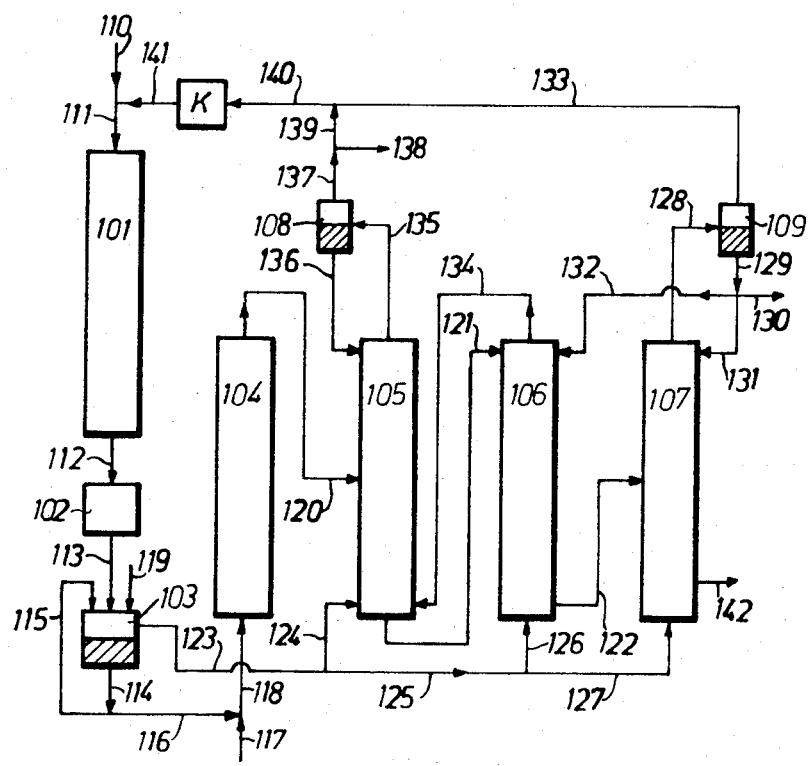
Figure 3:
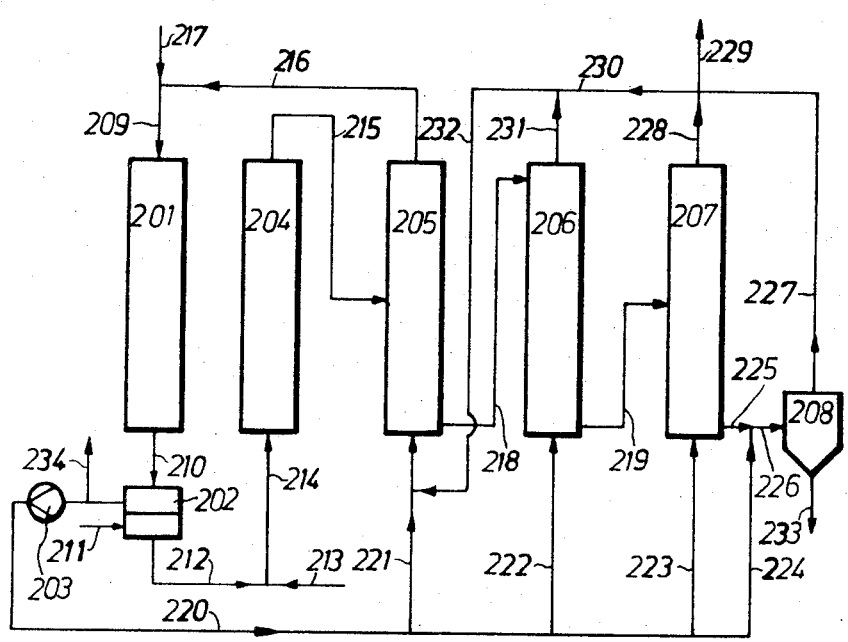

The invention will now be described more fully with reference to the accompanying drawings wherein:

FIGS. 1, 2 and 3 are flow sheets of different embodiments of processes in accordance with the present invention.

Referring now more particularly to FIG. 1, a mixture of crude naphthoquinone, naphthalene and phthalic anhydride is pumped into reaction tube 1 via pipe 7. Through pipe 14 recycled naphthalene and via pipe 9 butadiene are also supplied. The combined product stream from pipes 7 and 14 is conveyed to the reactor 1 via pipe 8 after combination with the stream from pipe 9 via pipe 10. The liquid reaction product from tube 1 is separated in distillation column 2 into naphthalene as the head product and tetrahydroanthraquinone and phthalic anhydride as the sump product. Naphthalene is removed via pipe 12 and a portion is recycled via pipe 14 and a portion withdrawn at pipe 13. At the sump of column 2 phthalic anhydride and tetrahydroanthraquinone are removed and together with recycled phthalic anhydride from pipe 25 conveyed via pipe 16 to the bubble column 3. Hot air is conveyed via pipe 17 to the bubble column at atmospheric pressure. The mixture of tetrahydroanthraquinone and phthalic anhydride is added via pipe 16. A gas stream is removed via pipe 18 which consists of nitrogen, oxygen, steam and gaseous phthalic anhydride. This is cooled in cooler 5, separated in separator 6 into liquid phthalic anhydride and a residual gas which is removed via pipe 19 and consists substantially of nitrogen, oxygen, steam and small amounts of phthalic anhydride. The liquid phthalic anhydride which accumulates in separator 6 is recycled via pipe 20 and 22 to the bubble column. From this stream a stream of phthalic anhydride is removed via pipe 21. At the sump of the bubble column a stream is removed consisting of phthalic anhydride and anthraquinone, and then passed via pipe 23 into the distillation column. In column 4 separation by distillation is carried out into phthalic anhydride which is passed via pipe 25 to the bubble column and into a sump product, which consists of anthraquinone of high purity.

In another technical embodiment of the process, work is carried out according to the diagram illustrated in FIG. 2. A gas mixture consisting substantially of nitrogen, oxygen, water vapor, carbon dioxide and naphthalene is conducted under pressure at an elevated temperature via pipe 111 through a reactor 101 in which a vanadium-containing catalyst is placed in parallel reaction tubes. Suitable working conditions are 5 to 7 atms, 250 to 400°C, reaction tubes 2 to 6 m long and 25 to 50 mm in diameter. The gaseous reaction product is removed through pipe 112, cooled in cooler 102 and conducted via pipe 113 to a separator. Separation is then carried out into a liquid and a gaseous phase. The liquid phase is removed from the separator 103 via pipe 114 and partly repumped into the separator via pipe 115, so that gas entering via pipe 113 is washed with the liquid product. The fresh naphthalene required for the reaction passes via pipe 119 into the separator 103. A product consisting substantially of naphthalene, naphthoquinone and phthalic anhydride is removed via pipe 116 and together with butadiene, which is introduced via pipe 117, conveyed via pipe 118 into a reactor 104 in which the reaction of the butadiene to form tetrahydroanthraquinone is carried out in the liquid phase under pressure at temperatures of 100 to 200°C. Optionally excess butadiene can be removed from the reaction product leaving the reactor 104 by releasing the pressure. A liquid product consisting substantially of tetrahydroanthraquinone, naphthalene and phthalic anhydride is introduced via pipe 120 into the distillation column 105. At the sump of column 105 a mixture consisting substantially of phthalic anhydride, tetrahydroanthraquinone and anthraquinone is removed and introduced via pipe 121 into bubble column 106. At the sump of bubble column 106 a liquid mixture consisting substantially of anthraquinone and phthalic anhydride is removed and introduced via pipe 122 into distillation column 107. The gas phase is removed from the separator 103 via pipe 123 and introduced via pipes 124, 125, 126 and 127 into distillation column 105, bubble column 106 and distillation column 107. A gas consisting substantially of nitrogen, oxygen, carbon dioxide, water and phthalic anhydride is removed via pipe 128 at the head of column 107. This gas stream is cooled, for example to 135°C. As a result, the major part of the phthalic anhydride contained in said gas stream is obtained in liquid form in the separator 109. The liquid phthalic anhydride is removed from the separator 109 via pipe 129. Part thereof is removed via pipe 130, another part is recycled via pipe 131 as reflux into column 107 and the remainder passed via pipe 132 to the head of bubble column 106. At the head of bubble column 106 a gas stream consisting substantially of nitrogen, oxygen, water vapor, carbon dioxide and phthalic anhydride is removed and recycled via pipe 134 to the distillation column 105. At the head of column 105 a gas stream is removed via pipe 135 which consists substantially of nitrogen, oxygen, water vapor, carbon dioxide and naphthalene. This gas stream is cooled so that a part of the naphthalene contained in this gas stream condenses as liquid naphthalene in separator 108. This liquid naphthalene is returned via pipe 136 as reflux into column 105. The gas accumulating in separator 108 is removed via pipe 137 and a branch stream given off as exhaust gas via pipe 138. This exhaust gas can be cooled, for example to 20 to 50°C, so that the main amount of the naphthalene contained in this stream condenses and can be recovered. After separating the naphthalene an exhaust gas consisting substantially of nitrogen, oxygen, carbon dioxide and water vapor is removed from the circulating gas. After removing the exhaust gas stream 138 the remainder of the stream is combined via pipe 139 with the gas stream removed from the separator 109 via pipe 133, which consists substantially of nitrogen, oxygen, water vapor and carbon dioxide and can contain small amounts of phthalic anhydride, and the combined stream is conducted via pipe 140 to a condenser K in which it is compressed, for example from 5 to 6 atms. The gas is conducted after compressing via pipes 141 and 111 to the reactor 101. Fresh oxygen in the form of air is added via pipe 110. Suitable temperatures for the distillation columns are: 220°C as the sump temperature and about 140°C as the head temperature for distillation column 105, 320°C as the sump temperature and about 220°C as the head temperature for column 107. The bubble column 106 can for example be operated at 220°C. A gas stream containing gaseous anthraquinone is withdrawn via pipe 142 from the lower part of the distillation column 107. Liquid or solid anthraquinone can be taken out of this gas stream by cooling. After separation of the anthraquinone, the remaining gas can be introduced into the stream of pipe 128.

In a further technical embodiment the process is carried out according to the diagram illustrated in FIG. 3. Via pipe 209 a gas mixture consisting substantially of nitrogen, oxygen, water vapor, carbon dioxide and naphthalene is conducted under pressure at an elevated temperature through a reactor 201 in which a vanadium-containing catalyst is arranged in parallel reaction tubes. Suitable working conditions are for example 5 – 7 atms, 250 – 400°C, concentrations in the starting material of 1 – 5 mole % of naphthalene, 5 – 18 mole % of water and 1 – 10 mole % of carbon dioxide. Suitable reaction tubes are reaction tubes 2 – 6 m in length and 25 – 50 mm in diameter. Via pipe 210 a gaseous reaction product is removed which consists substantially of nitrogen, oxygen, water vapor, carbon dioxide, naphthalene, naphthoquinone and phthalic anhydride. This gas stream is cooled to temperatures below the dew point of the gas, but above the melting point of the resulting condensate, e.g. to 90 to 110°C, and separated in a separataor 202 into a liquid and a gas phase. The fresh naphthalene is introduced via pipe 211 into the separator. Via pipe 212 a liquid product, which consists substantially of naphthalene, naphthoquinone and phthalic anhydride, is removed from the separator and after adding butadiene via pipe 213 and pipe 214 conducted to a hold up tube 204, in which the reaction of naphthoquinone with butadiene to form tetrahydroanthraquinone takes place. A liquid reaction product, which consists substantially of naphthalene, tetrahydroanthraquinone and phthalic anhydride, is conveyed via pipe 215 to the distillation column 205. At the sump of column 205 a liquid reaction product is removed, which consists substantially of phthalic anhydride, tetrahydroanthraquinone and, possibly, anthraquinone and is conveyed via pipe 218 into the bubble column 206. A liquid mixture consisting substantially of phthalic anhydride and anthraquinone is withdrawn at the sump of bubble column 206 and introduced via pipe 219 into the distillation column 207. The gas phase from the separator 202 is brought with the aid of compressor 203 to a pressure which is higher than the pressure loss of the gases in the different distillation columns and bubble column. For example, the gas phase produced under a pressure of 5 atms is compressed to a pressure of 7 atms. The compressed gas is withdrawn via pipe 220 and introduced at different points of the apparatus. Part of the gas phase is introduced into the sump of the distillation column 205 via pipe 221, part of the gas into the sump of the bubble column 206 via pipe 222, part into the sump of the distillation column 207 via pipe 223 and part of the gas stream combined via pipe 224 with a gas stream which is withdrawn from the lower part of the distillation column 207 via pipe 225. This gas stream is saturated with anthraquinone for example at a pressure of 5 to 7 atms and a temperature of 300 – 330°C. This gas stream is cooled to a temperature of for example 180 – 220°C by mixing with the gas stream 224 which has for example a temperature of 120 – 140°C. At this temperature the major part of gaseous anthraquinone contained in gas stream 225 is precipitated in the form of solid anthraquinone and separated from the gas phase in a cyclone 208. Solid, pure anthraquinone can be removed from the cyclone via pipe 223. The gas phase is removed from the cyclone via pipe 227. The gas stream, which accumulates at the head of column 207 and is withdrawn via pipe 228, is combined with gas stream 227 and further combined with gas stream 231 from bubble column 206 via pipe 230 and conveyed to the naphthalene column 205 via pipe 232. Liquid phthalic anhydride is precipitated out of the gas stream 228 by partial condensation and removed via pipe 229. At the head of the distillation column 205 there is removed via pipe 216 a naphthalene-containing gas stream, which is conducted to the reactor 201 via pipe 217 and via pipe 209, after adding fresh oxygen. The by-products carbon dioxide and steam, which are produced during the entire process, are withdrawn as a branch stream of the recycle gas via pipe 234. The following starting products are introduced into the reaction during the entire process: naphthalene via pipe 211, fresh air via pipe 217, butadiene via pipe 213. Solid anthraquinone is withdrawn via pipe 233 and liquid phthalic anhydride via pipe 229 as desired end products. In addition, a spent gas stream containing the by-products carbon dioxide and water vapor is drawn off via pipe 234.

The essential characteristics of the method of working as illustrated in FIG. 3 are: oxidation of naphthalene under pressure with a starting gas containing water vapor and carbon dioxide, recovery of a liquid crude naphthoquinone which consists of naphthalene, naphthoquinone and phthalic anhydride, performance of the distillations 205 and 207 under pressure in the presence of a part of the oxygen-containing recycle gas, oxidation of the tetrahydroanthraquinone in the bubble column 206 in the presence of a part of the oxygen-containing recycle gas, recycling of the phthalic anhydride-containing gas streams from column 207 and bubble column 206 into the sump of the naphthalene column 205 and separation of the phthalic anhydride in said column 205 while recovering a gas which is free of phthalic anhydride but contains naphthalene and which is recycled into the oxidation of naphthalene.

A further characteristic is the use of oxygen contents of about 5 to 8 mole % oxygen in the starting material for oxidation, the use of naphthalene concentrations of 1 – 5 mole % in the starting product and only partial reaction of the naphthalene in the straight passage. The naphthalene can be separated out of the spent gas stream 234 in a simple way, e.g. by cooling under pressure, so that clean air can be removed from the plant. Due to the avoidance of solid deposits in the entire system a technically advantageous, continuous performance of the process is possible.

As fresh naphthalene for the oxidation there may be used chemically pure naphthalene or different forms of commercially available naphthalene, e.g. petronaphthalene or pit-coal naphthalene, which can contain impurities, such as methyl naphthalene and sulfur compounds such as thionaphthalene.

In the Examples pit-coal naphthalene was used with a content of 0.2% by weight of sulfur.

The process according to the invention is technically simpler than the process according to the U.S. Pat. No. 2,938,913 and offers the following advantages over the U.S. Patent.

No foreign solvents are required. The solvents optionally required in the individual reaction steps such as reaction of naphthoquinone with butadiene to form tetrahydroanthraquinone and oxidehydrogenation of tetrahydroanthraquinone to form anthraquinone are naphthalene and phthalic anhydride, that is compounds which are already contained in the crude naphthoquinone which is produced by oxidation of naphthalene. The use of the solvents, which are part of the system, renders the working up and purification particularly simple.

For the reaction of naphthoquinone with butadiene and for the oxidehydrogenation to form anthraquinone, only simple distillation columns are required in addition to the usual reaction vessels. The outlay on distillation is low as the boiling points of the individual components vary very considerably.

The reactants in organic solvents are used in relatively high concentrations for the reactions. As a result these reactions, in particular oxidehydrogenation of tetrahydroanthraquinone with air, can be carried out in relatively small and cheap reactors.

A particular advantage of the process according to the invention consists in that the phthalic anhydride can be removed by distillation. This obviates the necessity of recovering the phthalic anhydride in the form of dilute aqueous phthalic acid by means of a costly extraction column and then converting this phthalic acid into phthalic anhydride at high temperatures by means of a technically difficult operation. In particular corrosion, which can occur when using phthalic acid at high temperatures, is completely avoided by the process according to the invention so that cheap materials can be used.

A further advantage represented by the process of the invention consists in that all reaction and separation operations can be carried out in the homogeneous phase. Hence, the continuous operation of anthraquinone manufacture is particularly simple from a technical point of view. Yet another advantage of the process according to the invention consists in that it offers various possibilities for leading off the reaction heat which forms during the individual process steps even when performing the process on a large scale in an economically advantageous way without involving the use of costly cooling equipment.

The following advantages are to be derived when carrying out the oxidation of naphthalene to naphthoquinone and phthalic anhydride under pressure at an oxygen concentration of 1 – 10 mole %:

The concentration of the naphthalene in the starting product can be freely selected since work is performed outside the explosion range of the system nitrogen, oxygen and naphthalene. Work can be carried out for example at a naphthalene concentration of 3 mole % and an oxygen concentration of 6 mole %, that is at an oxygen/naphthalene ratio of 2 : 1. This has an advantageous effect on the ratio naphthoquinone/phthalic anhydride and on the selectivity of the reaction. By cooling the reaction gas to temperatures above the melting point of naphthalene which is 80°C, a liquid crude naphthoquinone is obtained and this directly reacted with butadiene. The liquid crude naphthoquinone is separated and the remaining gas can be recycled into the reaction subsequent to compression and addition of air, the oxygen-containing gas being previously entirely or partially conducted under pressure through the naphthalene column, bubble column and the anthraquinone column. The oxygen-containing gases containing phthalic anhydride which leave the anthraquinone column and the bubble column can be conducted into the naphthalene column and freed in this column from phthalic anhydride, so that a naphthalene-containing gas substantially free of phthalic anhydride can be recycled into the reaction of naphthalene to naphthoquinone/phthalic anhydride. Since all gas streams can be recycled into the reaction to naphthoquinone/phthalic anhydride, it is only necessary to withdraw a small part of this gas consisting substantially of nitrogen, oxygen, steam and carbon dioxide from the system, in order to remove nitrogen and the products carbon dioxide and water from the system. The small amounts of organic products contained in this branch stream, in particular naphthalene, can be burnt by catalytic combustion to produce clean air so that anthraquinone, phthalic anhydride and clean air are obtained as end products of the entire process.

During recycling of the recycle gas the reaction products water and carbon dioxide are recycled. The content of steam in the starting product, e.g. on the order of 5 to 10 mole %, can have an advantageous effect on the selectivity of the process. The desired space/time yield of naphthoquinone can be adjusted within a wide range by variation of the oxygen content in the initial gas, by the temperature and residence time.

Small amounts of phthalic acid, which may be present in the crude naphthoquinone, are decomposed in the sump of the naphthalene column, which in general has a temperature of 200 to 220°C, to phthalic anhydride and water, so that very pure phthalic anhydride, which is free of phthalic acid, is obtained during subsequent working up by distillation.

Anthraquinone is employed as the starting product for the preparation of anthraquinone dyestuffs.

EXAMPLE 1

The run-through of this example is explained in the following with reference to FIG. 1.

The following products were pumped hourly in the liquid phase at 100°C into an insulated reaction tube 1 6 m in length and with an inside diameter of 50 mm:

Via pipe 7 3.42 kg of crude naphthoquinone with the composition 33% by weight of naphthoquinone, 33% by weight of naphthalene, 34% by weight phthalic anhydride; via pipe 14 3.40 kg of recycled naphthaline; via pipe 9 0.43 kg of butadiene.

The combined product stream from pipes 7 and 14 is conveyed to the reactor 1 via pipe 8 after combination with the stream from pipe 9 via pipe 10. The reaction is performed at 25 atms, an inlet temperature of 100°C and an outlet temperature of 160°C. The liquid reaction product is depressurized and separated in the distillation column 2 into naphthalene as the head product and tetrahydroanthraquinone and phthalic anhydride as the sump product. 4.5 kg of naphthalene are removed hourly via pipe 12 of which 3.4 kg are recycled via pipe 14 and 1.1 kg via pipe 13. At the sump of column 2 1.1 kg of phthalic anhydride and 1.5 kg of tetrahydroanthraquinone are removed hourly and together with 3.5 kg of recycled phthalic anhydride from pipe 25 conveyed via pipe 16 to the bubble column 3. The bubble column has an inside diameter of 70 mm and a length of 3 m. 2 cubic meters of air heated to 150°C are conveyed hourly via pipe 17 to the bubble column at atmospheric pressure. The mixture of tetrahydroanthraquinone and phthalic anhydride is added via pipe 16 at a temperature of 200°C. The temperature in the bubble column amounts to 220 – 230°C. A gas stream is removed via pipe 18 which consists of nitrogen, oxygen, steam and gaseous phthalic anhydride. This is cooled in cooler 5 to 140°C, separated in separator 6 at 140°C into liquid phthalic anhydride and a residual gas which is removed via pipe 19 and consists substantially of nitrogen, oxygen, steam and small amounts of phthalic anhydride. The liquid phthalic anhydride which accumulates in separator 6 is recycled via pipe 20 and 22 to the bubble column. From this stream there is removed hourly via pipe 21 a stream of 1.1 kg phthalic anhydride. At the sump of the bubble column a stream is removed hourly of 5.0 kg of a product, which consists of phthalic anhydride and anthraquinone, and then passed via pipe 23 into the distillation column. In column 4 separation by distillation is carried out into phthalic anhydride which is passed via pipe 25 to the bubble column and into a sump product, which consists of anthraquinone with a purity of 95 to 97% and is removed in an amount of 1.5 kg/h via pipe 24.

EXAMPLE 2

3 kg of a product consisting of 15% by weight of naphthoquinone, 70% by weight of naphthalene and 15% by weight of phthalic anhydride, and obtained by diluting with naphthalene a reaction product obtained by oxidation of naphthalene, are reacted with 0.2 kg of butadiene in a 10 l autoclave made of stainless steel at 120°C for 1 hour under the self-adjusting pressure. Thereafter the excess butadiene is released from pressure and the hot reaction product removed from the autoclave in liquid form. Analysis of the reaction mixture shows a conversion rate of naphthoquinone to tetrahydroanthraquinone of 98 mole %.

The naphthalene, non-reacted naphthoquinone and some phthalic anhydride are distilled from the reaction product at 50 mm Hg and a head temperature of 125 to 180°C. The sump product of this distillation is diluted with liquid phthalic anhydride in order to obtain a product with a concentration of tetrahydroanthraquinone of 20% by weight. This solution is treated in a bubble column with a finely distributed stream of air. The reaction temperature is 220°C, the reaction time 1 hour and the air throughput 200 l per kg of reaction solution. 31 parts by weight of the reaction solution in the form of phthalic anhydride are carried along by the air stream and recovered at 130 to 140°C in a series-connected separator in liquid form free of reaction water. The purity of the precipitated phthalic anhydride is 99.8%. A solution of anthraquinone in phthalic anhydride remains in the bubble column. Analysis of this product shows the conversion rate of the tetrahydroanthraquinone to anthraquinone to be 99 mole %. Analysis of the exhaust gas shows an oxygen conversion rate of about 50%.

The contents of the bubble column are separated in a vacuum distillation column at 150 mm Hg into phthalic anhydride of b.p. 215 – 290°C and crude anthraquinone, which is removed as the sump product. The phthalic anhydride still contains about 1.6% of anthraquinone as well as traces of non-reacted tetrahydroanthraquinone and is employed as the solvent for further reactions in the bubble column. The crude anthraquinone has a purity of 95.9% and is redistilled in another vacuum column at 150 mm Hg and obtained in pure form. The yield of pure anthraquinone based on consumed tetrahydroanthraquinone is 92 mole %.

EXAMPLE 3

The process is carried out as in Example 2, except that the reaction with butadiene is carried out under different conditions with regard to room temperature and reaction time. The following results are obtained:

| Temperature (°C) | Reaction Time (min.) | Naphthoquinone Conversion rate (%) |
|---|---|---|
| 150 | 30 | 97 |
| 200 | 15 | 98 |
| 250 | 5 | 98 |

EXAMPLE 4

Example 2 is repeated except that the naphthalene concentration in the initial product is varied for the reaction with butadiene. The following amounts are reacted each with 450 g of butadiene:

| Initial amounts (g) | | | Naphthalene concentration (%) | Naphthoquinone conversion rate (%) |
|---|---|---|---|---|
| Naphthalene | Naphthoquinone | Phthalic anhydride | | |
| 4200 | 450 | 450 | 82 | 98 |
| 1050 | 450 | 450 | 54 | 97 |
| 250 | 450 | 450 | 22 | 96 |

EXAMPLE 5

The process is carried out as in Example 1 except that the temperature in the bubble column is varied. The following results are obtained:

| Temperature of the bubble column (°C) | Anthraquinone Yield (kg/hours) |
|---|---|
| 180 – 190 | 1.5 |
| 200 – 210 | 1.5 |
| 240 – 250 | 1.5 |

EXAMPLE 6

The reaction of naphthalene to phthalic anhydride and anthraquinone is carried out as illustrated in FIG. 2. The reactor 101 consists of a reaction tube of steel 6 m in length and with an internal diameter of 33 mm. The reactor 104 consists of three series-connected stirrer autoclaves each holding 0.7 l. A packed column is employed as a distillation column 107 which has an inside diameter of 70 mm and a length of 2 m. The bubble column 106 consists of a reaction tube with an inside diameter of 70 mm and a length of 2 m. The distillation column 107 is a packed column 2 m long and 70 mm in diameter. Reactor 101 is filled with 5 liters of a catalyst containing vanadium. The production of the catalyst is described in the FIAT report 649, London, 1947, pages 2 to 3. Per hour 500 g of naphthalene, 486 g of oxygen, 4380 g of nitrogen, 194 g of water and 337 g of carbon dioxide are introduced in gaseous form via pipe 111 at 6 atms and 350°C. The gaseous mixture leaving the reactor is cooled to 95°C and separated in the naphthalene separator into a liquid and a gaseous phase. The liquid phase is conveyed together with 46 g of butadiene per hour to the reactor 104 in which the reaction of naphthoquinone to tetrahydroanthraquinone is carried out at a pressure of 5 atms at 120°C. The reaction product of reactor 104 is freed of excess butadiene by reducing the pressure to atmospheric pressure and then conveyed to the distillation column operated at 5 atms into which 50% of the gas passed in via pipe 123 is introduced via pipe 124. 25% of the gas is conveyed via pipe 126 to the bubble column and a further 25% of the gas via pipe 127 to column 107. 218 g of naphthalene are conveyed hourly via pipe 119 to the naphthalene separator. 206 g of oxygen and 677 g of nitrogen are added every hour via pipe 110. After recovery of the naphthalene by cooling the gas stream an exhaust gas is vented via pipe 138. The exhaust gas comprises nitrogen and oxygen and contains as reaction products 46 g of water and 70 g of carbon dioxide. 105 g of phthalic anhydride are removed hourly via pipe 140. 145 g of anthraquinone are obtained hourly via pipe 142.

It will be appreciated that the instant specification and examples are set forth by way of illustration and not limitation, and that various modifications and changes may be made without departing from the spirit and scope of the present invention.

What is claimed is:

1. In the production of anthraquinone wherein naphthalene is oxidized to form naphthoquinone and phthalic anhydride, the naphthoquinone is reacted with butadiene to form tetrahydroanthraquinone, and the tetrahydroanthraquinone is reacted with oxygen to form anthraquinone, the improvement which comprises effecting the reaction of naphthoquinone with butadiene at a temperature of about 80 to 250°C in the presence of about 20 to 90% by weight of naphthalene based on the weight of naphthalene, naphthoquinone and phthalic anhydride, to produce a reaction mixture comprising naphthalene, tetrahydroanthraquinone and phthalic anhydride, separating the naphthalene from said reaction mixture, reacting the remaining mixture comprising tetrahydroanthraquinone and about 50 to 90% by weight of phthalic anhydride at a temperature of about 150 to 300°C with molecular oxygen, and removing phthalic anhydride from an oxidation reaction mixture comprising anthraquinone and phthalic anhydride.

2. The process according to claim 1, wherein the reaction with butadiene is carried out in the liquid phase, and the phthalic anhydride is removed by distillation from the reaction mixture comprising anthraquinone and phthalic anhydride in order to recover the anthraquinone.

3. The process according to claim 1, wherein the naphthalene is separated by distillation from the butadiene reaction mixture consisting of naphthalene, tetrahydroanthraquinone and phthalic anhydride.

4. The process according to claim 1, wherein the mixture is treated with molecular oxygen at about 180 to 250°C.

5. The process according to claim 4, wherein the molecular oxygen is employed in the form of air.

6. The process according to claim 5, wherein the conversion of tetrahydroanthraquinone to anthraquinone by air is carried out in a bubble column.

7. The process according to claim 3, wherein the separation of naphthalene from the butadiene reaction mixture comprising naphthalene, tetrahydroanthraquinone and phthalic anhydride is effected by distillation in the presence of an oxygen-containing gas.

8. The process according to claim 7, wherein the distillation is carried out in a column at a pressure up to about 10 atmospheres in the presence of a gas added to the sump of said column and containing about 1 to 10 mole % of oxygen plus nitrogen, carbon dioxide, steam and optionally naphthalene and phthalic anhydride.

9. The process according to claim 2, wherein the separation of the phthalic anhydride from the reaction mixture comprising anthraquinone and phthalic anhydride is carried out by distillation in the presence of an oxygen-containing gas.

10. The process according to claim 9, wherein the distillation is carried out in a column at a pressure up to about 10 atmospheres in the presence of a gas added to the sump of said column and containing about 1 to 10 mole % of oxygen plus nitrogen, carbon dioxide, steam and optionally naphthalene.

11. The process according to claim 1, wherein the oxidation reaction mixture comprising anthraquinone and phthalic anhydride is cooled thereby to precipitate solid anthraquinone, and the solid anthraquinone is separated mechanically from the liquid phthalic anhydride.

12. The process according to claim 2, wherein the reaction with butadiene is performed with the butadiene at least partly in gaseous state.

* * * * *